United States Patent
Hofmann et al.

(10) Patent No.: US 12,060,454 B2
(45) Date of Patent: Aug. 13, 2024

(54) PROCESS FOR THE CONTINUOUS PRODUCTION OF POLYOXYALKYLENE POLYOLS

(71) Applicant: Covestro Intellectual Property GmbH & Co. KG, Leverkusen (DE)

(72) Inventors: Joerg Hofmann, Krefeld (DE); Thorsten Schmitz, Dormagen (DE); Philipp Sander, Grevenbroich (DE); Marcus Eichmann, Düsseldorf (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 513 days.

(21) Appl. No.: 17/612,071

(22) PCT Filed: May 29, 2020

(86) PCT No.: PCT/EP2020/064952
§ 371 (c)(1),
(2) Date: Nov. 17, 2021

(87) PCT Pub. No.: WO2020/245039
PCT Pub. Date: Dec. 10, 2020

(65) Prior Publication Data
US 2022/0204691 A1 Jun. 30, 2022

(30) Foreign Application Priority Data
Jun. 5, 2019 (EP) .................................... 19178310

(51) Int. Cl.
C08G 65/26 (2006.01)

(52) U.S. Cl.
CPC ..... C08G 65/2609 (2013.01); C08G 65/2606 (2013.01); C08G 65/2663 (2013.01); C08G 65/2696 (2013.01); C08G 2650/58 (2013.01)

(58) Field of Classification Search
CPC ............ C08G 65/2609; C08G 65/2663; C08G 2650/58; C08G 65/2606; C08G 65/2696
See application file for complete search history.

(56) References Cited

U.S. PATENT DOCUMENTS

| | | |
|---|---|---|
| 3,404,109 A | 10/1968 | Milgrom |
| 3,538,043 A | 11/1970 | Herold |
| 3,829,505 A | 8/1974 | Herold |
| 3,941,849 A | 3/1976 | Herold |
| 4,355,188 A | 10/1982 | Herold et al. |
| 4,500,704 A | 2/1985 | Kruper, Jr. et al. |
| 4,721,818 A | 1/1988 | Harper et al. |
| 4,826,887 A | 5/1989 | Kuyper et al. |
| 4,877,906 A | 10/1989 | Harper |
| 4,987,271 A | 1/1991 | Watabe et al. |
| 5,010,047 A | 4/1991 | Schuchardt |
| 5,032,671 A | 7/1991 | Harper |
| 5,099,075 A | 3/1992 | Katz et al. |
| 5,158,922 A | 10/1992 | Hinney et al. |
| 5,391,722 A | 2/1995 | Chandalia et al. |
| 5,470,813 A | 11/1995 | Le-Khac |
| 5,482,908 A | 1/1996 | Le-Khac |
| 5,545,601 A | 8/1996 | Le-Khac |
| 5,627,120 A | 5/1997 | Le-Khac |
| 5,689,012 A | 11/1997 | Pazos et al. |
| 5,712,216 A | 1/1998 | Le-Khac et al. |
| 5,714,428 A | 2/1998 | Le-Khac |
| 6,077,978 A | 6/2000 | McDaniel et al. |
| 6,646,100 B2 | 11/2003 | Hofmann et al. |
| 6,780,813 B1 | 8/2004 | Hofmann et al. |
| 7,008,900 B1 | 3/2006 | Hofmann et al. |
| 8,912,364 B2 | 12/2014 | Villa et al. |
| 8,946,466 B2 | 2/2015 | Gurtler et al. |
| 10,040,901 B2 | 8/2018 | Hofmann et al. |
| 10,239,995 B2 | 3/2019 | Hofmann et al. |
| 2003/0158449 A1 | 8/2003 | Hofmann et al. |
| 2003/0204042 A1 | 10/2003 | Moethrath et al. |
| 2004/0260056 A1 | 12/2004 | Yamada et al. |
| 2005/0107643 A1 | 5/2005 | Ostrowski et al. |
| 2007/0225394 A1 | 9/2007 | Ostrowski et al. |
| 2008/0021154 A1 | 1/2008 | Haider et al. |
| 2008/0214778 A1 | 9/2008 | Herwig et al. |
| 2012/0283483 A1 | 11/2012 | Weston et al. |
| 2014/0275633 A1 | 9/2014 | Reese et al. |
| 2018/0036704 A1 | 2/2018 | Lai et al. |

FOREIGN PATENT DOCUMENTS

| | | |
|---|---|---|
| EP | 0406440 A1 | 1/1991 |
| JP | 4145123 B2 | 9/2008 |

OTHER PUBLICATIONS

Ullmann's Encyclopedia of Industrial Chemistry, 5th ed., vol. B4, 1992, pp. 167ff.
Handbuch Apparate, 1st. ed., Vulkan-Verlag, 1990, pp. 188-208.
International Search Report, PCT/EP2020/064952, date of mailing: Aug. 21, 2020, Authorized officer: Francis Adigbli.

*Primary Examiner* — Rabon A Sergent
(74) *Attorney, Agent, or Firm* — Donald R. Palladino

(57) ABSTRACT

The invention relates to a process for producing a polyoxyalkylene polyol, comprising depositing an alkylene oxide onto an H-functional starter substance in the presence of a double metal cyanide (DMC) catalyst, wherein the alkylene oxide is dosed at the mass flow rate m(alkylene oxide), the H-functional starter substance is dosed at the mass flow rate m(starter substance), and the double metal cyanide (DMC) catalyst is dosed in a dispersant at the mass flow rate m(DMC) continuously into the reactor with the reaction volume V during the reaction, and the resulting reaction mixture is continuously removed from the reactor, and wherein the quotient of the sum of the mass flow rates $\Sigma \dot{m}$ of $\dot{m}$(alkylene oxide), $\dot{m}$(starter substance) and $\dot{m}$(DMC) to give the reaction volume V in the steady state is greater than or equal to 1200 g/(h·L).

15 Claims, No Drawings

PROCESS FOR THE CONTINUOUS PRODUCTION OF POLYOXYALKYLENE POLYOLS

CROSS-REFERENCE TO RELATED APPLICATION

This application is a National Phase Application of PCT/EP2020/064952, filed May 29, 2020, which claims priority to European Application No. 19178310.9 filed Jun. 5, 2019, each of which is being incorporated herein by reference.

FIELD

The present invention relates to a process for preparing a polyoxyalkylene polyol comprising addition of an alkylene oxide onto an H-functional starter substance in the presence of a double metal cyanide (DMC) catalyst, wherein the alkylene oxide with the mass flow ṁ(alkylene oxide), the H-functional starter substance with the mass flow ṁ(starter substance) and the double metal cyanide (DMC) catalyst in a dispersion medium with the mass flow ṁ(DMC) are during the reaction continuously metered into the reactor having the reaction volume V and the resulting reaction mixture is continuously removed from the reactor and wherein the quotient of the sum of the mass flows Σṁ, composed of ṁ(alkylene oxide), ṁ(starter substance) and ṁ(DMC), to the reaction volume V in the steady state is not less than 1200 g/(h·L).

BACKGROUND

WO 98/03571 discloses a continuous process for preparing polyoxyalkylene polyols with continuous metered addition of starter substances using DMC catalysts. The described residence times are between 50 and 315 minutes at a reaction temperature of 130° C., wherein the resulting polyether polyols feature a low degree of unsaturation and a low polydispersity.

WO 2005/047365 A1 likewise describes a continuous process for preparing polyether polyols in the presence of DMC catalysts, wherein starter substance and alkylene oxides are metered in in an amount such that the fill level in the reactor remains constant and DMC catalyst is metered in such that the catalyst concentration in the reactor necessary for continuous operation of the reactor is maintained The average residence times described in the examples are 100 minutes.

EP 1 469 027 A1 discloses a process for continuous polyether polyol preparation by means of DMC catalysis, wherein no gas phase fraction is present in the reactor. The residence times described in the examples are about 60 minutes.

WO 2006/002807 A1 describes a 2-stage process for continuous preparation of polyether polyols by means of DMC catalysis, wherein epoxides, starter substance and DMC catalyst are metered into the first reactor and only epoxides (and optionally further DMC catalyst) are metered into the downstream second reactor. The residence times described in the examples are around 100 minutes.

WO 2007/009905 A1 discloses a process for 2-stage continuous preparation of polyether polyols by means of DMC catalysis, wherein in the first step in a continuously operating reactor epoxides undergo addition reaction onto starter substances and the discharged product from this reactor is in a second step transferred into a so-called compartment reactor for final reaction of the epoxides. The residence times in the first reactor (CSTR) are 60 minutes.

WO 2009/143103 A1 describes a continuous process for DMC-catalyzed preparation of polyether polyols in a recirculating reactor system, wherein the specified residence times are between 90 and 180 minutes.

WO 2011/075333 A1 discloses a 2-stage continuous process for polyether polyols having a low equivalent molar mass (<500) in the presence of DMC catalysts, wherein the specified reactor residence times are in the range of several hours.

WO 2014/159551 A1 describes an improved continuous process for DMC-catalyzed preparation of short-chain polyether polyols in the OHN range of 400-112, wherein the described residence times are 2.5 hours (150) minutes.

WO 2018/026571 A1 describes a process for continuous DMC-catalyzed preparation of polyether polyols with heat recovery. An efficient removal of the heat of reaction from the exothermic alkoxylation reaction makes it possible to increase the space-time yield and thus plant capacity without any change in product quality. The space-time yields of not more than 653 g/(L h) reported in the patent examples correspond to a minimum reactor residence time of about 90 minutes.

SUMMARY

Starting from the prior art it was an object of the present invention to provide an improved process for preparing polyoxyalkylene polyols, wherein the process efficiency, i.e. the polyoxyalkylene polyol amount preparable per unit time, can be increased without a deterioration in the product quality of the resulting polyoxyalkylene polyols or else a need to use more catalyst which might require subsequent removal. Specifically, the polyoxyalkylene polyols shall be provided with a comparably narrow molar mass distribution with a polydispersity index (PDI) of ≤1.20 and/or comparably low viscosities compared to the preparation process previously described in the prior art. An increase in process efficiency is advantageous since it allows preparation of more polyoxyalkylene polyols per unit time/the use of smaller reactors to prepare comparable polyoxyalkylene polyol amounts per unit time.

The object was surprisingly achieved by a process for preparing a polyoxyalkylene polyol comprising addition of an alkylene oxide onto an H-functional starter substance in the presence of a double metal cyanide (DMC) catalyst, wherein the alkylene oxide with the mass flow ṁ(alkylene oxide), the H-functional starter substance with the mass flow ṁ(starter substance)and the double metal cyanide (DMC) catalyst in a dispersion medium with the mass flow ṁ(DMC) are during the reaction continuously metered into the reactor having the reaction volume V and the resulting reaction mixture is continuously removed from the reactor and wherein the quotient of the sum of the mass flows Σṁ, composed of ṁ(alkylene oxide), ṁ(starter substance) and ṁ(DM C), to the reaction volume V in the steady state is not less than 1200 g/(h·L).

DETAILED DESCRIPTION

The steady state, i.e. the steady operating state of the reactor in continuous operation, is according to the general knowledge in the art characterized in that changes over time in the process variables such as pressure and temperature or the product properties such as for example viscosity and polydispersity no longer occur. A change in a process variable such as for example the volume flow of one or more reactant components or the temperature typically results, after a transition phase, in a new second steady state differing from the first steady state possibly with other product properties. For the process according to the invention the steady state is typically achieved after six to eight residence times, wherein the residence time is the quotient of the reaction volume and the outflowing volume flow.

In the process according to the invention polyoxyalkylene polyols are understood as meaning addition products of one or more alkylene oxides and optionally one or more comonomers such as for example $CO_2$ and/or cyclic anhydrides onto one or more H-functional starter substances in the presence of the double metal cyanide (DMC) catalyst, wherein polyether polyols, polyether ester polyols, polycarbonate polyols, polyether carbonate polyols or polyether ester carbonate polyols are obtainable.

In a preferred embodiment of the process according to the invention the polyoxyalkylene polyol is a polyether polyol, wherein the polyether polyol is obtainable by addition of one or more alkylene oxides onto one or more H-functional starter substances in the presence of the double metal cyanide (DMC) catalyst.

According to the definition commonly used in the art a mass flow $\dot{m}$ is the mass of a medium, for example alkylene oxide or H-functional starter substance, passing through a cross-section per unit of time. The mass flow is typically reported in units of kilograms per second or else grams per hour.

The reactor volume $V_R$ is the available internal volume of a reactor. In the case of a stirred tank reactor for example this includes not only the free internal volume of the stirred tank (free volume taking into account any internals) but also the reaction-side volume of any external heat exchanger circuit connected to the stirred tank. The reactor volume $V_R$ may be determined for example by completely filling the reactor with a liquid of known density and subsequently determining the mass of this liquid ("volumetric determination").

The reaction volume V is the portion of the reactor volume $V_R$ occupied by the liquid reaction medium. In the presence of a gas phase having the volume $V_G$ the reactor volume $V_R$ is the sum of the reaction volume V and the volume of the gas phase $V_G$. A continuous reactor for preparing polyoxyalkylene polyols may be operated such that there is practically no free gas phase in the reactor. This is preferably achieved by ensuring the outflowing liquid flow exits the reactor at the highest point. In the case of such a fully flooded reactor, i.e. a reactor without a substantial proportion of a gas phase, the reaction volume V corresponds to the reactor volume VR, thus corresponding to a "liquid-sealed state" of the reactor according to EP 1 469 027 A1.

In a preferred embodiment of the process according to the invention the reaction volume V is identical to the reactor volume $V_R$.

In a preferred embodiment the quotient of the sum of the inflowing mass flows $\Sigma\dot{m}$, composed of $\dot{m}$(alkylene oxide), $\dot{m}$(starter substance) and $\dot{m}$(DMC), to the reaction volume V in the steady state is not less than 1500 g/(h·L), preferably not less than 1800 g/(h·L).

In a further preferred embodiment the quotient of the sum of the mass flows $\Sigma\dot{m}$, composed of $\dot{m}$(alkylene oxide), $\dot{m}$(starter substance) and $\dot{m}$(DMC), to the reaction volume V in the steady state is not more than 4000 g/(h·L), preferably 3750 g/(h·L) and particularly preferably 3500 g/(h·L).

In a particularly preferred embodiment of the process according to the invention the quotient of the sum of the mass flows $\Sigma\dot{m}$, composed of $\dot{m}$(alkylene oxide), $\dot{m}$(starter substance) and $\dot{m}$(DMC), to the reaction volume V in the steady state is 1200 g/(h·L) to 4000 g/(h·L), preferably 1500 g/(h·L) to 3750 g/(h·L) and particularly preferably from 1800 g/(h·L) to 3500 g/(h·L).

DMC catalysts suitable for the process of the invention are known in principle from the prior art (see, for example, U.S. Pat. Nos. 3,404,109, 3,829,505, 3,941,849 and 5,158,922). DMC catalysts, which are described, for example, in U.S. Pat. No. 5,470,813, EP-A 700949, EP-A 743093, EP-A 761708, WO 97/40086, WO 98/16310 and WO 00/47649, have a very high activity in the polymerization of alkylene oxides and enable the preparation of polyoxyalkylene polyols under optimal conditions at very low catalyst concentrations (100 ppm or less), such that removal of the catalyst from the finished product is generally no longer required. A typical example is that of the highly active DMC catalysts which are described in EP-A 700949 and contain not only a double metal cyanide compound (e.g. zinc hexacyanocobaltate(III)) and an organic complex ligand (e.g. tert-butanol) but also a polyoxyalkylene compound having a number-average molecular weight greater than 500 g/mol. It is also possible to use the alkaline DMC catalysts disclosed in EP application number 10163170.3.

In one embodiment of the process according to the invention the double metal cyanide (DMC) catalyst is obtainable by reaction of an aqueous solution of a cyanide-free metal salt, an aqueous solution of a metal cyanide salt, an organic complex ligand and a complex-forming component.

Cyanide-free metal salts suitable for preparation of the double metal cyanide compounds preferably have the general formula (I)

$$M(X)_n \qquad (I)$$

wherein

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate and n is 2 when X=halide, hydroxide, cyanate, thiocyanate, isocyanate, isothiocyanate or nitrate, or suitable cyanide-free metal salts have the general formula (II)

$$M_r(X)_3 \qquad (II)$$

wherein

M is selected from the metal cations $Fe^{3+}$, $Al^{3+}$ and $Cr^{3+}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalates and r is 1 when X=halide, hydroxide, cyanate, thiocyanate, isocyanate, isothiocyanate, carboxylate or nitrate, or suitable cyanide-free metal salts have the general formula (III), $$M(X)_s \qquad (III)$$

wherein

M is selected from the metal cations $Mo^{4+}$, $V^{4+}$ and $W^{4+}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate and s is 4 when X=halide, hydroxide, cyanate, thiocyanate, isocyanate, isothiocyanate, carboxylate or nitrate, or suitable cyanide-free metal salts have the general formula (IV), $$M(X)_t \qquad (IV)$$

wherein

M is selected from the metal cations $Mo^{6+}$ and $W^{6+}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate and t is 6 when X=halide, hydroxide, cyanate, thiocyanate, isocyanate, isothiocyanate, carboxylate or nitrate.

Examples of suitable cyanide-free metal salts are zinc chloride, zinc bromide, zinc iodide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (V)

$$(Y)_a M'(CN)_b (A)_c \qquad (V)$$

wherein

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$, $Cs^+$) and alkaline earth metal (i.e. $Be^{2+}$, $Ca^{2+}$, $Mg^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, oxalate or nitrate and a, b and c are integers, wherein the values for a, b and c are selected so as to ensure the electroneutrality of the metal cyanide salt; a is preferably 1, 2, 3 or 4; b is preferably 4, 5 or 6; c preferably has the value 0.

Examples of suitable metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds present in the DMC catalysts are compounds of general formula (VI)

$$M_x[M'_{x'}(CN)_y]_z \qquad (VI),$$

where M is as defined in formula (I) to (IV) and

M' is as defined in formula (V), and x, x', y and z are integers and are chosen so as to ensure electronic neutrality of the double metal cyanide compound.

It is preferable when x=3, x'=1, y=6 and z=2,

M=Zn(II), Fe(II), Co(II) or Ni(II) and

M'=Co(III), Fe(III), Cr(III) or Ir(III).

In a preferred embodiment of the process according to the invention the double metal cyanide compound is one or more compound(s) selected from the group consisting of zinc hexacyanocobaltate(III), zinc hexacyanoiridate(III), zinc hexacyanoferrate(III) and cobalt(II) hexacyanocobaltate(III). The use of zinc hexacyanocobaltate(III) is particularly preferred.

The organic complex ligands added in the preparation of the DMC catalysts are disclosed, for example, in U.S. Pat. No. 5,158,922 (see especially column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086. The organic complex ligands employed are, for example, water-soluble organic compounds having heteroatoms, such as oxygen, nitrogen, phosphorus or sulfur, capable of forming complexes with the double metal cyanide compound. Preferred organic complex ligands are alcohols, aldehydes, ketones, ethers, esters, amides, ureas, nitriles, sulfides and mixtures thereof Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds comprising both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol for example). The most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

In a preferred embodiment of the process according to the invention the organic complex ligand is one or more compound(s) selected from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol, preferably tert-butanol.

To prepare the DMC catalysts the process according to the invention may employ one or more complex-forming component(s) from the classes of the polyethers, polyesters, polycarbonates, polyalkylene glycol sorbitan esters, polyalkylene glycol glycidyl ethers, polyacrylamide, poly (acrylamide-co-acrylic acid), poly acrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinyl pyrrolidone, poly(N-vinyl-pyrrolidone-co-acrylic acid), polyvinyl methyl ketone, poly(4-vinylphenol), poly (acrylic acid-co-styrene), oxazoline polymers, polyalkyleneimines, maleic acid and maleic anhydride copolymers, hydroxyethylcellulose and polyacetals, or the glycidyl ethers, glycosides, carboxylic acid esters of polyhydric alcohols, esters or amides, cyclodextrins or phosphorus compounds.

The process according to the invention preferably employs the complex-forming component(s) to prepare the DMC catalysts.

The process according to the invention preferably employs polyethers as the complex-forming component to prepare the DMC catalysts.

In a preferred embodiment the polyether has a number-average molecular weight of ≥500 g/mol, wherein the number-average molecular weight is calculated from the determined OH number.

Suitable polyethers include those prepared by ring-opening polymerization of cyclic ethers, wherein these cyclic ethers also comprise oxetane and also tetrahydrofuran for example. Any form of catalysis is possible for this purpose. The polyether comprises suitable end groups, for example hydroxyl, amine, ester or ether end groups.

In a particularly preferred embodiment the polyether has an average hydroxyl functionality of 2 to 8 and a number-average molecular weight in the range from 500 g/mol to 10 000 g/mol, preferably from 700 g/mol to 5000 g/mol, wherein the number-average molecular weight is calculated from the determined OH number.

In one embodiment of the process according to the invention the complex-forming component is a polyether polyol, wherein the polyether polyols are obtained by reaction of alkylene oxides and H-functional starter substances in the presence of acidic, basic and/or organometallic catalysts. These organometallic catalysts are for example double metal cyanide (DMC) catalysts.

Suitable polyether polyols are poly(oxypropylene) polyols, poly(oxypropyleneoxyethylene) polyols, polytetramethylene ether glycols and block copolymers containing poly(oxy)ethylene, poly(oxy)propylene and/or poly(oxy)butylene blocks, such as for example poly(oxy)ethylene-poly(oxy)propylene block copolymers having terminal poly(oxy)ethylene blocks.

In a preferred embodiment the polyether polyol is a poly(oxypropylene) polyol having a number-average molecular weight of ≥500 g/mol, wherein the number-average molecular weight is calculated from the determined OH number.

In a particularly preferred embodiment the polyether polyol is a poly(oxypropylene) polyol, preferably a poly(oxypropylene) diol and/or a poly(oxypropylene) triol having a number-average molecular weight of 700 g/mol to 4000 g/mol, wherein the number-average molecular weight is calculated from the determined OH number.

In an alternative embodiment the polyethers have an average hydroxyl functionality of 2 to 8 and a number-average molecular weight in the range from 150 g/mol to less than 500 g/mol, preferably from 200 g/mol to 400 g/mol, wherein the number-average molecular weight is calculated from the determined OH number.

Suitable alternative polyether polyols are poly(oxypropylene) polyols, poly(oxypropyleneoxyethylene) polyols, polytetramethylene ether glycols and block copolymers containing poly(oxy)ethylene, poly(oxy)propylene and/or poly(oxy)butylene blocks, for example poly(oxy)ethylene-poly(oxy)propylene block copolymers having terminal poly(oxy)ethylene blocks. Also suitable are tripropylene glycol, triethylene glycol, tetrapropylene glycol, tetraethylene glycol, dipropylene glycol monomethyl ether, tripropylene glycol monomethyl ether, and monoalkyl and dialkyl ethers of glycols and poly(alkylene glycol)s.

In a particularly preferred alternative embodiment the alternative polyether polyol is a polypropylene glycol and/or a polyethylene glycol having a number-average molecular weight in the range from 150 g/mol to less than 500 g/mol, wherein the number-average molecular weight is calculated from the determined OH number.

It is preferable when in the preparation of the DMC catalysts in the first step the aqueous solutions of the metal salt (e.g. zinc chloride), used in a stoichiometric excess (at least 50 mol %) based on metal cyanide salt (i.e. at least a molar ratio of cyanide-free metal salt to metal cyanide salt of 2.25:1.00), and of the metal cyanide salt (e.g. potassium hexacyanocobaltate) are reacted in the presence of the organic complex ligand (e.g. tert-butanol) to form a suspension containing the double metal cyanide compound (e.g. zinc hexacyanocobaltate), water, excess cyanide-free metal salt, and the organic complex ligands. This organic complex ligand may be present in the aqueous solution of the cyanide-free metal salt and/or of the metal cyanide salt, or it is added directly to the suspension obtained after precipitation of the double metal cyanide compound. It has proven advantageous to mix the aqueous solutions of the cyanide-free metal salt and of the metal cyanide salt and the organic complex ligands with vigorous stirring. Optionally, the suspension formed in the first step is subsequently treated with a further complex-forming component. The complex-forming component is preferably employed in a mixture with water and organic complex ligand. A preferred process for performing the first step (i.e. the preparation of the suspension) is effected using a mixing nozzle, particularly preferably using a jet disperser, as described in WO-A 01/39883.

In the second step, the solid (i.e. the precursor of the catalyst of the invention) is isolated from the suspension by known techniques, such as centrifugation or filtration.

In a preferred variant for preparing the catalyst, the isolated solids are subsequently washed in a third process step with an aqueous solution of the organic complex ligand (for example by resuspension and subsequent reisolation by filtration or centrifugation). Water-soluble by-products for example, such as potassium chloride, can be removed from the catalyst in this way. It is preferable when the amount of the organic complex ligand in the aqueous wash solution is between 40% and 80% by mass, based on the overall solution.

The third step may optionally comprise admixing the aqueous wash solution with one or more further complex-forming component(s), preferably in the range between 0.5% and 5% by mass, based on the overall solution.

It is moreover advantageous to wash the isolated solid more than once. To this end, the first washing procedure may be repeated for example. However, it is preferable to use non-aqueous solutions for further washing operations, for example a mixture of organic complex ligand and further complex-forming component.

The isolated and optionally washed solid is subsequently dried at temperatures of generally 20-100° C. and at absolute pressures of generally 0.1 mbar to atmospheric pressure (1013 mbar), optionally after pulverizing.

A preferred process for isolation of the DMC catalysts from the suspension by filtration, filtercake washing and drying is described in WO-A 01/80994.

In one embodiment of the process according to the invention the concentration of the double metal cyanide (DMC) catalyst is 50 ppm or less, preferably 10 ppm to 50 ppm, particularly preferably 15 ppm to 40 ppm, based on the sum of alkylene oxide, H-functional starter substance, dispersion medium and double metal cyanide (DMC) catalyst, which not only results in a sufficiently high catalytic activity coupled with good polyoxyalkylene polyol product quality but also has the result that the catalyst need not be removed for the further processing of the polyoxyalkylene polyol.

It is preferable when the DMC catalyst remains in the end product, but it can also be removed, for example by treatment with adsorbents. Processes for removing DMC catalysts are described, for example, in U.S. Pat. No. 4,987,271, DE-A 3132258, EP-A 406440, U.S. Pat. Nos. 5,391,722, 5,099,075, 4,721,818, 4,877,906 and EP-A 385619.

The process according to the invention for preparing the polyoxyalkylene polyols employs at least one H-functional starter substance.

Suitable H-functional starter substances (starters) that may be employed include compounds having alkoxylation-active H atoms. Alkoxylation-active groups having active hydrogen atoms are, for example, —OH, —NH2 (primary amines), —NH— (secondary amines), —SH, and —CO2H, preference being given to —OH and —NH2, particular preference to —OH. As H-functional starter substance one or more compounds may for example be selected from the group comprising mono- or polyhydric alcohols, polyfunctional amines, polyhydric thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines (for example the products called Jeffamine® from Huntsman, for example D-230, D-400, D-2000, T-403, T-3000, T-5000 or corresponding BASF products, for example Polyetheramine D230, D400, D200, T403, T5000), polytetrahydrofurans (e.g. PolyTHF® from BASF, for example PolyTHF® 250, 650S, 1000, 1000S, 1400, 1800, 2000), polytetrahydrofuranamines (BASF product Polytetrahydrofuranamine 1700), polyether thiols, polyacrylate polyols, castor oil, the mono- or diglyceride of ricinoleic acid, monoglycerides of fatty acids, chemically modified mono-, di- and/or triglycerides of fatty acids, and C1-C24-alkyl fatty acid esters containing an average of at least 2 OH groups per molecule. Examples of C1-C23 alkyl fatty acid esters containing on average at least 2 OH groups per molecule are commercial products such as Lupranol Balance® (from BASF AG), Merginol® products (from Hobum Oleochemicals GmbH), Sovermol® products (from Cognis Deutschland GmbH & Co. KG), and Soyol®TM products (from USSC Co.).

Monofunctional starter substances that may be employed include alcohols, amines, thiols and carboxylic acids. Monofunctional alcohols that may be used include: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Suitable monofunctional amines include: butylamine, tert-butylamine, pentylamine, hexylamine, aniline, aziridine, pyrrolidine, piperidine, morpholine. Monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Examples of polyhydric alcohols suitable as H-functional starter substances include for example dihydric alcohols (for example ethylene glycol, diethylene glycol, propylene glycol, dipropylene glycol, propane-1,3-diol, butane-1,4-diol, butene-1,4-diol, butyne-1,4-diol, neopentyl glycol, pentane-1,5-diol, methylpentanediols (for example 3-methylpentane-1,5-diol), hexane-1,6-diol, octane-1,8-diol, decane-1,10-diol, dodecane-1,12-diol, bis(hydroxymethyl) cyclohexanes (for example 1,4-bis(hydroxymethyl) cyclohexane), triethylene glycol, tetraethylene glycol, polyethylene glycols, dipropylene glycol, tripropylene glycol, polypropylene glycols, dibutylene glycol, and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and also all products of modification of these aforementioned alcohols having different amounts of ε-caprolactone.

The H-functional starter substances may also be selected from the substance class of the polyether polyols, especially those having a molecular weight Mn in the range from 100 to 4000 g/mol. Preference is given to polyether polyols formed from repeating ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide. Suitable polyether polyols constructed from repeating propylene oxide and/or ethylene oxide units are for example the Desmophen®, Acclaim®, Arcol®, Baycoll®, Bayfill®, Bayflex®, Baygal®, PET® and polyether polyols from Covestro AG (e.g. Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are for example the Pluriol® E products from BASF SE, suitable homopolypropylene oxides are for example the Pluriol® P products from BASF SE, suitable mixed copolymers of ethylene oxide and propylene oxide are for example the Pluronic® PE or Pluriol® RPE products from BASF SE.

The H-functional starter substances may also be selected from the substance class of the polyester polyols, especially those having a molecular weight Mn in the range from 200 to 4500 g/mol. Polyesters having a functionality of at least two can be used as polyester polyols. Polyester polyols preferably consist of alternating acid and alcohol units. Examples of acid components that may be used include succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the recited acids and/or anhydrides. Alcohol components employed include for example ethanediol, 1,2-propanediol, 1,3-propanediol, 1,4-butanediol, 1,5-pentane diol, neopentyl glycol, 1,6-hexanediol, 1,4-bis(hydroxymethyl)cyclohexane, diethylene glycol, dipropylene glycol, trimethylolpropane, glycerol, pentaerythritol or mixtures of the stated alcohols. Employing dihydric or polyhydric polyether polyols as the alcohol component affords polyester ether polyols which can likewise serve as starter substances for preparation of the polyethercarbonate polyols. It is preferable to use polyether polyols having Mn=150 to 2000 g/mol for preparing the polyester ether polyols.

H-functional starter substances that may be employed further include polycarbonate diols, in particular those having a molecular weight Mn in the range from 150 to 4500 g/mol, preferably 500 to 2500 g/mol, prepared, for example, by reaction of phosgene, dimethyl carbonate, diethyl carbonate or diphenyl carbonate and difunctional alcohols or polyester polyols or polyether polyols. Examples for polycarbonates may be found, for example, in EP-A 1359177. Polycarbonate diols that may be used include for example the Desmophen® C line from Cove stro AG, for example Desmophen® C 1100 or Desmophen® C 2200.

In a further embodiment of the invention, polyether carbonate polyols and/or polyether ester carbonate polyols may be used as H-functional starter substances. Polyether ester carbonate polyols in particular may be employed. To this end, these polyether ester carbonate polyols used as H-functional starter substances may be prepared beforehand in a separate reaction step.

The H-functional starter substances generally have an OH functionality (i.e. the number of polymerization-active H atoms per molecule) of 1 to 8, preferably of 2 to 6 and particularly preferably of 2 to 4. The H-functional starter substances are used either individually or as a mixture of at least two H-functional starter substances.

Preferred H-functional starter substances are alcohols having a composition according to general formula (VII),

HO—(CH2)x—OH (VII)

wherein x is a number from 1 to 20, preferably an even number from 2 to 20. Examples of alcohols of formula (VII) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols of formula (VII) with ε-caprolactone, for example reaction products of trimethylolpropane with ε-caprolactone, reaction products of glycerol with ε-caprolactone and reaction products of pentaerythritol with ε-caprolactone. Preference is further given to using, as H-functional starter substances, water, diethylene glycol, dipropylene glycol, castor oil, sorbitol and polyether polyols formed from repeating polyalkylene oxide units.

The H-functional starter substances are particularly preferably one or more compound(s) selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, diethylene glycol, dipropylene glycol, glycerol, trimethylolpropane, di- and trifunctional polyether polyols, where the polyether polyol has been formed from a di- or tri-H-functional starter substance and propylene oxide or a di- or tri-H-functional starter substance, propylene oxide and ethylene oxide. The polyether polyols preferably have an OH functionality of 2 to 4 and a molecular weight Mn in the range from 106 to 4500 g/mol and in particular a molecular weight Mn in the range from 106 to 3000 g/mol.

According to the general definition in the art a dispersion medium (disperant) is a continuous phase in which a second, insoluble or sparingly soluble dispersed phase, for example the double metal cyanide (DMC) catalyst, is present.

In one embodiment of the process according to the invention the dispersion medium used for supplying the DMC catalyst corresponds to the above-described H-functional starter substance. In a preferred embodiment the dispersion medium is one or more compound(s) selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane and di- and trifunctional polyether polyols.

In an alternative, less preferred embodiment of the process according to the invention the DMC catalyst dispersion comprises the DMC catalyst and the dispersion medium, wherein the disposition medium is one or more compound(s) selected from the group consisting of 4-methyl-2-oxo-1,3-dioxolane, 1,3-dioxolan-2-one, acetone, methyl ethyl ketone, acetonitrile, nitromethane, dimethyl sulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene and carbon tetrachloride.

For the process of the invention, the at least one alkylene oxide has 2 to 24 carbon atoms. The alkylene oxides having 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, and 3-glycidyloxypropyltriisopropoxysilane.

In the process of the invention, the alkylene oxide used is preferably ethylene oxide, propylene oxide or a mixture of ethylene oxide and propylene oxide. If mixtures of ethylene oxide and propylene oxide are used, these preferably have up to 75% by mass of ethylene oxide, more preferably up to 50% by mass of ethylene oxide and most preferably up to 30% by mass of ethylene oxide, based on the total mass of the mixture of ethylene oxide and propylene oxide. It is particularly preferable to employ exclusively propylene oxide and mixtures of ethylene oxide and propylene oxide comprising up to 30% by mass of ethylene oxide based on the total mass of the mixture of ethylene oxide and propylene oxide. The alkylene oxides can be fed into the reactor as individual components or as a mixture. It is likewise possible to feed two or more alkylene oxides into the reactor in succession, which makes it possible to achieve polyoxyalkylene chains having a block structure. In the metered addition of two or more alkylene oxides, it is possible to change the composition of the alkylene oxide stream supplied continuously or instantaneously.

Further monomers copolymerizable with alkylene oxides under DMC catalysis by the process of the invention are, for example, aliphatic lactones, aromatic lactones, lactides, cyclic carbonates having preferably at least three optionally substituted methylene groups between the oxygen atoms of the carbonate group, aliphatic cyclic anhydrides and aromatic cyclic anhydrides and carbon dioxide.

Aliphatic or aromatic lactones are cyclic compounds containing an ester bond in the ring. Preferred compounds are 4-membered-ring lactones such as β-propiolactone, β-butyrolactone, β-isovalerolactone, β-caprolactone, β-isocaprolactone, β-methyl-β-valerolactone, 5-membered-ring lactones, such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered-ring lactones, such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered-ring lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, and lactones with higher numbers of ring members, such as (7E)-oxacycloheptadec-7-en-2-one.

Lactides are cyclic compounds containing two or more ester bonds in the ring. Preferred compounds are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-dione, and 3,6-di(but-3-en-1-yl)-1,4-dioxane-2,5-dione (in each case inclusive of optically active forms). L-lactide is particularly preferred.

Cyclic carbonates used are preferably compounds having at least three optionally substituted methylene groups between the oxygen atoms of the carbonate group. Preferred compounds are trimethylene carbonate, neopentyl glycol carbonate (5,5-dimethyl-1,3-dioxan-2-one), 2,2,4-trimethylpentane-1,3-diol carbonate, 2,2-dimethylbutane-1,3-diol carbonate, butane-1,3-diol carbonate, 2-methylpropane-1,3-diol carbonate, pentane-2,4-diol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Under the conditions of the process of the invention, cyclic carbonates having fewer than three optionally substituted methylene groups between the oxygen atoms of the carbonate group are incorporated into the polymer chain not at all or only to a small extent.

Cyclic anhydrides are cyclic compounds containing an anhydride group in the ring. Preferred compounds are succinic anhydride, maleic anhydride, phthalic anhydride, cyclohexane-1,2-dicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H,5H)-trione, 3-ethyldihydrofuran-2,5-dione, 3-methoxydihydrofuran-2,5-dione, 3-(prop-2-en-1-yl) dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

Their use is also described in U.S. Pat. Nos. 3,538,043, 4,500,704, 5,032,671, 6,646,100, EP-A 222453 and WO-A 2008/013731.

In one embodiment the at least one H-functional starter substance is admixed with DMC catalyst and charged into a reactor, i.e. the H-functional starter substance and the DMC catalyst are charged into a reactor. It is additionally possible to add small amounts (1 to 500 ppm) of organic or inorganic acids to the H-functional starter substance prior to the addition of the DMC catalyst, as described, for example, in WO-A 99/14258.

In a preferred procedure, the reactor contents are first stripped, in the reactor itself or optionally in a preceding step in a further apparatus, with inert gas (nitrogen or a noble gas, for example argon) at temperatures of 60 to 160° C., preferably 100 to 155° C., most preferably 110 to 155° C., with stirring over a period of preferably 10 to 60 min. In the course of stripping, volatile constituents are removed with introduction of inert gases into the liquid phase with simultaneous application of reduced pressure, at an absolute pressure of 5 to 500 mbar. The temperature can subsequently be adjusted to the reaction temperature if this is not identical to the stripping temperature. The ultimate reaction temperature can alternatively be established only in the initial phase of the alkylene oxide metering, for example utilizing the liberated heat of reaction.

In all of the described embodiments the polymerization, i.e. the preparation of a polyoxyalkylene polyol by addition of an alkylene oxide onto an H-functional starter substance in the presence of a double metal cyanide (DMC) catalyst, may be performed at a reaction temperature of 100° C. to 180° C.

To this end the reactor is continuously supplied with one or more alkylene oxides, one or more H-functional starter substances and a dispersion of the double metal cyanide (DMC) catalyst in a dispersion medium. Since H-functional starter substances and DMC catalyst are typically already in the reactor before commencement of the alkylene oxide metering, in a preferred embodiment the continuous metering of the H-functional starter substances and DMC catalyst commences only after an initial phase comprising solely alkylene oxide metering.

In one embodiment of the process according to the invention the reaction temperature is 130° C. to 170° C., preferably 140° C. to 165° C. This is advantageous since at higher reaction/process temperatures of ≥130° C., preferably ≥140° C., the heat of reaction may be utilized for production of steam at higher pressures. The higher its pressure, the more valuable the steam generated. The thermodynamic maximum achievable steam pressure increases with increasing reaction temperature on account of the vapor pressure curve of the water. Accordingly, the steam pressure at 130° C. is 2.7 bar absolute, at 140° C. is 3.6 bar absolute, at 150° C. is 4.8 bar absolute and at 160° C. is 6.2 bar absolute. The steam generated from the heat of reaction of the polymerization may be used for coupling this polymerization step to other process steps for the preparation of polyoxyalkylene polyols and for (thermal) integration with other industrial chemical processes. At a reaction temperature above 180° C. the reaction rate markedly decreases due to thermal deactivation of the DMC catalyst.

The described temperature limits may be varied during the polymerization, for example it may prove advantageous to increase the reaction temperature with increasing progress of the reaction.

It is likewise possible to meter the at least one alkylene oxide into the reactor in different ways. One option is metered addition into the gas phase or directly into the liquid phase, for example via an immersed tube or a distributor ring close to the reactor base in a zone with good mixing. Metered addition to the liquid phase is the preferred variant. In the case of metered addition into the liquid phase, the metering units should be designed so as to be self-emptying, for example by introduction of the metering holes at the lower end of the distributor ring. The alkylene oxides are fed continuously to the reactor in such a way that the safety-related pressure limits of the reactor system used are not exceeded.

If two or more alkylene oxides are being metered in, the respective alkylene oxides may be supplied to the reactor separately or as an alkylene oxide mixture. Mixing of the alkylene oxides can be achieved, for example, by means of a mixing unit present in the common metering zone ("inline blending"). It has also been found to be useful to meter alkylene oxides, on the pump pressure side, individually or in (pre)mixed form into a pumped circulation system conducted, for example, through heat exchangers. In that case, for good mixing with the reaction medium, it is advantageous to integrate a high-shear mixing unit into the alkylene oxide/reaction medium stream. The temperature of the exothermic polymerization (alkylene oxide addition reaction) is kept at the desired level or adjusted to the desired level by cooling. According to the prior art relating to the design of polymerization reactors for exothermic reactions (for example Ullmann's Encyclopedia of Industrial Chemistry, vol. B4, pp. 167 ff., 5th ed., 1992), such cooling is generally effected via the reactor wall (e.g. jacket, half-coil pipe) and by means of further heat exchange surfaces disposed internally in the reactor and/or externally in the pumped circulation system, for example in cooling coils, cooling cartridges, or plate, shell-and-tube or mixer heat exchangers.

When using stirred reactors good mixing of the reactor contents should generally be ensured through configuration and use of commercially available stirring apparatuses, suitable stirring apparatuses here especially including stirrers arranged over one or more levels or stirrer types which act over the full fill height (see, for example, Handbuch Apparate; Vulkan-Verlag Essen, 1st ed. (1990), p. 188-208). Of particular technical relevance here is a specific mixing power which is introduced on average over the entire reactor contents and is generally in the range from 0.2 to 5 W/L, with correspondingly higher local power inputs in the region of the stirrer units themselves and possibly in the case of relatively low fill levels. In order to achieve an optimal stirring effect, combinations of baffles (e.g. flat or tubular flow baffles) and cooling coils (or cooling candles) may be arranged within the reactor according to general prior art, and these may also extend across the vessel base. It is alternatively also possible to achieve the necessary mixing exclusively via a pumped circulation circuit passing through a heat exchanger or to operate this pumped circulation circuit as a further mixing component in addition to the stirrer unit, thus effecting pumped circulation of the entire reactor contents as required (typically 1 to 50 times per hour). The specific mixing output introduced by means of pumped circulation, for example by means of an external heat exchanger or, in the case of recycling into the reactor, by means of a nozzle or injector, likewise amounts to values averaging from 0.2 to 5 W/L, this being based on the liquid volume present in the reactor and the pumped circulation system at the end of the reaction phase.

A wide variety of different reactor types are suitable for the performance of the process of the invention. Preference is given to using cylindrical vessels having a height/diameter ratio of 1:1 to 10:1. Useful reactor bases include hemispherical, dished, flat or conical bases, for example.

In one embodiment of the process according to the invention the reaction mixture continuously outflowing from the reactor is continuously transferred into a postreactor to reduce the content of free alkylene oxide, wherein the content of free alkylene oxide is preferably reduced to values of less than 5 ppm. This postreactor, preferably a tubular reactor is operated at temperatures of 80° C. to 180° C., wherein the reaction mixture has an average residence time in the postreactor of 10 min to 60 min. No further metering of the alkylene oxide, the H-functional starter substance and/or the double metal cyanide (DMC) catalyst is carried out in the postreactor. In the present patent application the reactor volume of the postreactor $V_N$ is not taken into account for the reaction volume V and thus also not for calculating the quotient of the sum of the mass flows $\Sigma \dot{m}$, composed of $\dot{m}$(alkylene oxide), $\dot{m}$(starter substance) and $\dot{m}$(DMC), and the reaction volume V.

The polyoxyalkylene polyol prepared by the process according to the invention may optionally be completely freed of small amounts of unconverted alkylene oxide under vacuum, for example at an absolute pressure of 1 to 500 mbar, or by stripping. Stripping removes volatile constituents, for example (residual) alkylene oxides, with introduction of inert gases and/or steam into the liquid phase with simultaneous application of reduced pressure (for example by passing inert gas through at an absolute pressure of 5 to 500 mbar). The removal of volatile constituents, for example of unconverted alkylene oxides, either under reduced pressure or by stripping, is generally effected at temperatures of 20° C. to 200° C., preferably at 50° C. to 160° C. Such stripping operations can also be performed in what are called stripping columns, in which an inert gas or steam stream is passed counter to the product stream. Preference is given to using stripping columns having random packings or internals for this purpose. Such stripping operations can also be performed continuously, for example by continuously supplying the unstripped material to the stripping column It is optionally possible to add aging stabilizers, for example antioxidants, to the polyoxyalkylene polyols prepared by the process of the invention.

The polyoxyalkylene polyols obtainable by the process according to the invention may be reacted with polyisocyanates alone or optionally in admixture with further isocyanate-reactive components, optionally in the presence of blowing agents, optionally in the presence of catalysts and optionally with further additives, for example cell stabilizers, and thus serve as components of solid or foamed polyurethanes, for example flexible polyurethane foam such as for example slabstock flexible polyurethane foam and molded flexible polyurethane foam. The polyoxyalkylene polyols prepared by the process of the invention can especially also be used as components for adhesive and sealant materials. For example, they can serve as precursor polyols for the preparation of silane-terminated polyoxyalkylenes which can in turn find use in moisture-curing sealant systems.

The invention likewise provides polyurethanes, preferably solid or foamed polyurethanes, especially flexible polyurethane foams, for example slabstock flexible polyurethane foams and molded flexible polyurethane foams, or adhesive and sealant materials, comprising the polyoxyalkylene polyols prepared by the process of the invention.

In a first embodiment the invention relates to a process for preparing a polyoxyalkylene polyol comprising addition of an alkylene oxide onto an H-functional starter substance in the presence of a double metal cyanide (DMC) catalyst, wherein the alkylene oxide with the mass flow $\dot{m}$(alkylene oxide), the H-functional starter substance with the mass flow $\dot{m}$(starter substance) and the double metal cyanide (DMC) catalyst in a dispersion medium with the mass flow $\dot{m}$(DMC) are during the reaction continuously metered into the reactor having the reaction volume V and the resulting reaction mixture is continuously removed from the reactor and wherein the quotient of the sum of the mass flows $\Sigma\dot{m}$, composed of $\dot{m}$(alkylene oxide), $\dot{m}$(starter substance) and $\dot{m}$(DMC), and the reaction volume V in the steady state is not less than 1200 g/(h·L).

In a second embodiment the invention relates to a process according to the first embodiment, wherein the quotient of the sum of the mass flows $\Sigma\dot{m}$, composed of $\dot{m}$(alkylene oxide), $\dot{m}$(starter substance) and $\dot{m}$(DMC), and the reaction volume V in the steady state is not less than 1500 g/(h·L), preferably not less than 1800 g/(h·L).

In a third embodiment the invention relates to a process according to the first or second embodiment, wherein the quotient of the sum of the mass flows $\Sigma\dot{m}$, composed of $\dot{m}$(alkylene oxide), $\dot{m}$(starter substance) and $\dot{m}$(DMC), and the reaction volume V in the steady state is not more than 4000 g/(h·L), preferably 3750 g/(h·L) and particularly preferably 3500 g/(h·L).

In a fourth embodiment the invention relates to a process according to any of the first to third embodiments, wherein the reaction volume V is identical to the reactor volume $V_R$.

In a fifth embodiment the invention relates to a process according to any of the first to fourth embodiments, wherein the polyoxyalkylene polyol is a polyether polyol.

In a sixth embodiment the invention relates to a process according to any of the first to fifth embodiments, wherein the concentration of the double metal cyanide (DMC) catalyst is 50 ppm or less, preferably 10 ppm to 50 ppm, particularly preferably 15 ppm to 40 ppm, based on the sum of alkylene oxide, H-functional starter substance, dispersion medium and double metal cyanide (DMC) catalyst.

In a seventh embodiment the invention relates to a process according to any of the first to sixth embodiments, wherein the double metal cyanide (DMC) catalyst is obtainable by reaction of an aqueous solution of a cyanide-free metal salt, an aqueous solution of a metal cyanide salt, an organic complex ligand and a complex-forming component.

In an eighth embodiment the invention relates to a process according to the seventh embodiment, wherein the complex-forming component is a polyether polyol, preferably a poly(oxypropylene) polyol having a number-average molecular weight of ≥500 g/mol, wherein the number-average molecular weight is calculated from the determined OH number.

In a ninth embodiment the invention relates to a process according to the seventh or eighth embodiment, wherein the organic complex ligand is one or more compound(s) selected from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol, preferably tert-butanol.

In a tenth embodiment the invention relates to a process according to any of the first to ninth embodiments, wherein the H-functional starter substance is one or more compound(s) selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane and di- and trifunctional polyether polyols.

In an eleventh embodiment the invention relates to a process according to any of the first to tenth embodiments, wherein the dispersion medium is the H-functional starter substance according to any of the first to tenth embodiments.

In a twelfth embodiment the invention relates to a process according to any of the first to eleventh embodiments, wherein the alkylene oxide is ethylene oxide, propylene oxide or a mixture of ethylene oxide and propylene oxide.

In a thirteenth embodiment the invention relates to a process according to any of the first to twelfth embodiments, wherein the reaction temperature is 130° C. to 170° C., preferably 140° C. to 165° C.

In a fourteenth embodiment the invention relates to a process according to any of the first to thirteenth embodiments, wherein the reaction mixture continuously outflowing from the reactor is continuously transferred into a postreactor to reduce the content of free alkylene oxide.

In a fifteenth embodiment the invention relates to a process according to any of the first to fourteenth embodiments, wherein the quotient of the sum of the mass flows $\Sigma\dot{m}$, composed of $\dot{m}$(alkylene oxide), $\dot{m}$(starter substance) and $\dot{m}$(DMC), and the reaction volume V in the steady state is 1200 g/(h·L) to 4000 g/(h·L), preferably 1500 g/(h·L) to 3750 g/(h·L) and particularly preferably from 1800 g/(h·L) to 3500 g/(h·L).

EXAMPLES

OH numbers were determined according to the procedure of DIN 53240. Viscosities were determined by rotational viscometer (Physica MCR 51, Anton Paar) according to the procedure of DIN 53018.

The number-average $M_n$ and the weight-average $M_w$ of the molecular weight and the polydispersity index PDI ($M_w/M_n$) of the products was determined by gel permeation chromatography (GPC). The procedure of DIN 55672-1 was followed: "Gel permeation chromatography, Part 1—Tetrahydrofuran as eluent" (SECurity GPC System from PSS Polymer Service, flow rate 1.0 ml/min; columns: 2×PSS SDV linear M, 8×300 mm, 5 μm; RID detector). Polystyrene samples of known molar mass were used for calibration.

Raw Materials Used

Catalyst for alkylene oxide addition (DMC catalyst):

double metal cyanide catalyst, containing zinc hexacyanocobaltate, tert-butanol and polypropylene glycol having a number-average molecular weight of 1000 g/mol; described in WO-A 01/80994, example 6.

Example 1 (Comparative)

A continuously operated stainless steel pressure reactor having an available reactor volume $V_R$ of 1.951 liters filled with a polyether polyol (OH functionality=2.82; OH number=48 mg KOH/g; propylene oxide/ethylene oxide ratio=89.5/10.5; containing 25 ppm DMC catalyst) had the following components metered into it at the reported mass flows at a temperature of 150° C. with stirring (800 rpm):
- propylene oxide at 817.50 g/h
- ethylene oxide at 95.51 g/h
- glycerol at 21.69 g/h
- dispersion of 0.00613 g of DMC catalyst in 1 g of propylene glycol at 3.83 g/h The reaction mixture was continuously withdrawn from the pressure reactor while the reactor was always completely filled with liquid, and the reaction volume V therefore corresponded to the reactor volume $V_R$. Completion of the reaction was effected by continuously transferring the withdrawn reaction mixture into a postreactor (tubular reactor having an internal volume of 1.0 L) temperature controlled to 100° C. After exiting the postreactor the obtained product was cooled to room temperature and then subjected to analytical examination. Table 1 reports the analytical values for a sample taken after a total reaction time corresponding to 12 residence times.

Example 2 (Comparative)

The procedure of example 1 (comparative) was followed with the exception that the following components were metered at the reported mass flows at a temperature of 150° C.:
- propylene oxide at 1090.00 g/h
- ethylene oxide at 127.88 g/h
- glycerol at 28.92 g/h
- dispersion of 0.00613 g of DMC catalyst in 1 g of propylene glycol at 5.10 g/h

Example 3 (Comparative)

The procedure of example 1 (comparative) was followed with the exception that the following components were metered at the reported mass flows at a temperature of 150° C.:
- propylene oxide at 1362.50 g/h
- ethylene oxide at 159.85 g/h
- glycerol at 36.15 g/h
- dispersion of 0.00613 g of DMC catalyst in 1 g of propylene glycol at 6.38 g/h

Example 4 (Comparative)

The procedure of example 1 (comparative) was followed with the exception that the following components were metered at the reported mass flows at a temperature of 130° C.:
- propylene oxide at 817.50 g/h
- ethylene oxide at 95.51 g/h
- glycerol at 21.69 g/h
- dispersion of 0.00613 g of DMC catalyst in 1 g of propylene glycol at 3.83 g/h

Example 5 (Comparative)

The procedure of example 1 (comparative) was followed with the exception that the following components were metered at the reported mass flows at a temperature of 130° C.:
- propylene oxide at 1362.50 g/h
- ethylene oxide at 159.85 g/h
- glycerol at 36.15 g/h
- dispersion of 0.00613 g of DMC catalyst in 1 g of propylene glycol at 6.38 g/h

Example 6 (Comparative)

The procedure of example 1 (comparative) was followed with the exception that the following components were metered at the reported mass flows at a temperature of 130° C.:
- propylene oxide at 1635.00 g/h
- ethylene oxide at 191.82 g/h
- glycerol at 43.38 g/h
- dispersion of 0.00613 g of DMC catalyst in 1 g of propylene glycol at 7.66 g/h

Example 7

The procedure of example 1 (comparative) was followed with the exception that the following components were metered at the reported mass flows at a temperature of 130° C.:
- propylene oxide at 3270.00 g/h
- ethylene oxide at 383.63 g/h
- glycerol at 86.76 g/h
- dispersion of 0.00613 g of DMC catalyst in 1 g of propylene glycol at 15.31 g/h

Example 8

The procedure of example 1 (comparative) was followed with the exception that the following components were metered at the reported mass flows at a temperature of 150° C.:
- propylene oxide at 3270.00 g/h
- ethylene oxide at 383.63 g/h
- glycerol at 86.76 g/h
- dispersion of 0.00613 g of DMC catalyst in 1 g of propylene glycol at 15.31 g/h

Example 9

The procedure of example 1 (comparative) was followed with the exception that the following components were metered at the reported mass flows at a temperature of 160° C.:
- propylene oxide at 3270.00 g/h
- ethylene oxide at 383.63 g/h
- glycerol at 86.76 g/h
- dispersion of 0.00613 g of DMC catalyst in 1 g of propylene glycol at 15.31 g/h

Example 10

The procedure of example 1 (comparative) was followed with the exception that the following components were metered at the reported mass flows at a temperature of 150° C.:
- propylene oxide at 3633.33 g/h
- ethylene oxide at 426.26 g/h
- glycerol at 96.40 g/h
- dispersion of 0.00613 g of DMC catalyst in 1 g of propylene glycol at 17.01 g/h

Example 11

The procedure of example 1 (comparative) was followed with the exception that the following components were metered at the reported mass flows at a temperature of 150° C.:

propylene oxide at 2180.00 g/h
ethylene oxide at 255.75 g/h
glycerol at 57.84 g/h
dispersion of 0.00613 g of DMC catalyst in 1 g of propylene glycol at 10.21 g/h Example 12

The procedure of example 1 (comparative) was followed with the exception that the following components were metered at the reported mass flows at a temperature of 150° C.:
propylene oxide at 3924.00 g/h
ethylene oxide at 460.36 g/h
glycerol at 104.11 g/h
dispersion of 0.00613 g of DMC catalyst in 1 g of propylene glycol at 18.37 g/h Example 13

The procedure of example 1 (comparative) was followed with the exception that the following components were metered at the reported mass flows at a temperature of 150° C.:
propylene oxide at 4562.79 g/h
ethylene oxide at 535.30 g/h
glycerol at 121.06 g/h
dispersion of 0.00613 g of DMC catalyst in 1 g of propylene glycol at 21.36 g/h The values reported in table 1 for $\Sigma\dot{m}/V$ [g/(h·L)] (=quotient of the sum of the mass flows $\Sigma\dot{m}$, composed of $\dot{m}$(alkylene oxide), $\dot{m}$(starter substance) and $\dot{m}$(DMC), and the reaction volume V in the steady state) are calculated as the quotient of the sum of the mass flows (g/h) reported in the abovementoned examples and the reaction volume of 1.951 liters.

The residence times (VWZ) reported in table 1 are defined as the quotient of the reaction volume V and the outflowing volume flow. The volume flow is calculated as the quotient of the sum of the mass flows and the density of the product at the respective reaction temperature:
T=130° C.: density=0.9486 g/ml
T=150° C.: density=0.9304 g/ml
T=160° C.: density=0.9205 g/ml

TABLE 1

Summary of results

| Example | $\Sigma\dot{m}/V$ [g/(h·L)] | VWZ [min] | Temperature [° C.] | Viscosity 25° C./ corrected [mPas]* | PDI [$M_w M_n$] |
|---|---|---|---|---|---|
| 1 (comp.) | 481 | 116 | 150 | 703 | 1.18 |
| 2 (comp.) | 642 | 87 | 150 | 694 | 1.13 |
| 3 (comp.) | 802 | 70 | 150 | 694 | 1.15 |
| 4 (comp.) | 481 | 118 | 130 | 700 | 1.13 |
| 5 (comp.) | 802 | 71 | 130 | 693 | 1.12 |
| 6 (comp.) | 963 | 59 | 130 | 699 | 1.10 |
| 7 | 1925 | 30 | 130 | 699 | 1.17 |
| 8 | 1925 | 29 | 150 | 708 | 1.15 |
| 9 | 1925 | 29 | 160 | 710 | 1.18 |
| 10 | 2139 | 26 | 130 | 721 | 1.15 |
| 11 | 1283 | 43 | 150 | 721 | 1.15 |
| 12 | 2310 | 24 | 150 | 717 | 1.16 |
| 13 | 2686 | 21 | 150 | 723 | 1.15 |

*Corrected viscosity (25° C.) = measured viscosity (25° C.) + 13 * (OH number − 48)
Comp. = comparative example

The invention claimed is:

1. A process for preparing a polyoxyalkylene polyol comprising addition of an alkylene oxide onto an H-functional starter substance in the presence of a double metal cyanide (DMC) catalyst;
wherein the alkylene oxide with a mass flow $\dot{m}$(alkviene oxide), the H-functional starter substance with a mass flow $\dot{m}$(starter substance) and the double metal cyanide (DMC) catalyst in a dispersion medium with a mass flow $\dot{m}$(DMC) are during the reaction continuously metered into a reactor having a reaction volume V and the resulting reaction mixture is continuously removed from the reactor;
and wherein the quotient of the sum of the mass $\Sigma\dot{m}$, composed of $\dot{m}$(alkylene oxide), $\dot{m}$(starter substance) and $\dot{m}$(DMC), and the reaction volume V in the steady state is not less than 1200 g/(h·L).

2. The process as claimed in claim 1, wherein the quotient of the sum of the mass flows $\Sigma\dot{m}$, composed of $\dot{m}$(olkylene oxide), $\dot{m}$(starter substance) and $\dot{m}$(DMC), and the reaction volume V in the steady state is not less than 1500 g/(h·L).

3. The process as claimed in claim 1, wherein the quotient of the sum of the mass flows $\Sigma\dot{m}$, composed of $\dot{m}$(alkylene oxide), $\dot{m}$(starter substance) and $\dot{m}$(DMC), and the reaction volume V in the steady state is not more than 4000 g/(h·L).

4. The process as claimed in claim 1, wherein the reaction volume V is identical to the reactor volume $V_R$.

5. The process as claimed in claim 1, wherein the polyoxyalkylene polyol comprises a polyether polyol.

6. The process as claimed in claim 1, wherein the concentration of the double metal cyanide (DMC) catalyst is 50 ppm or less, based on the sum of alkylene oxide, H-functional starter substance, dispersion medium and double metal cyanide (DMC) catalyst.

7. The process as claimed in claim 1, wherein the double metal cyanide (DMC) catalyst is obtained by reaction of an aqueous solution of a cyanide-free metal salt, an aqueous solution of a metal cyanide salt, an organic complex ligand and a complex-forming component.

8. The process as claimed in claim 7, wherein the complex-forming component is a polyether polyol having a number-average molecular weight of ≥500 g/mol, wherein the number-average molecular weight is calculated from the determined OH number.

9. The process as claimed in claim 7, wherein the organic complex ligand comprises one or more of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

10. The process as claimed in claim 1, wherein the H-functional starter substance comprises one or more of ethylene glycol, propylene glycol, 1,3-propanediol, 1,3-butanediol, 1,4-butanediol, 1,5-pentanediol , 2-methylpropane-1,3-diol, neopentyl glycol, 1,6-hexanediol, diethylene glycol, dipropylene glycol, glycerol, trimethylolpropane and di- and trifunctional polyether polyols.

11. The process as claimed in claim 1, wherein the dispersion medium is the same as the H-functional starter substance.

12. The process as claimed in claim 1, wherein the alkylene oxide is ethylene oxide, propylene oxide or a mixture of ethylene oxide and propylene oxide.

13. The process as claimed in claim 1, wherein the reaction temperature is 130° C. to 170° C.

14. The process as claimed in claim 1, wherein the reaction mixture continuously outflowing from the reactor is continuously transferred into a postreactor to reduce the content of free alkylene oxide.

15. The process as claimed in claim 1, wherein the quotient of the sum of the mass flows $\Sigma\dot{m}$, composed of $\dot{m}$(olkylene oxide), $\dot{m}$(starter substance) and $\dot{m}$(DMC), and the reaction volume V in the steady state is 1200 g/(h·L) to 4000 g/(h·L).

* * * * *